(12) United States Patent
Shuster et al.

(10) Patent No.: US 11,816,022 B2
(45) Date of Patent: Nov. 14, 2023

(54) SNAPSHOT SIMULATION OF SERVICE MODULE RESPONSES

(71) Applicant: Red Hat Israel, Ltd., Raanana (IL)

(72) Inventors: Boaz Shuster, Kefar Saba (IL); Oded Ramraz, Wellesley, MA (US)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 16/026,416

(22) Filed: Jul. 3, 2018

(65) Prior Publication Data

US 2020/0012591 A1  Jan. 9, 2020

(51) Int. Cl.
| | |
|---|---|
| *G06F 16/955* | (2019.01) |
| *G06N 20/00* | (2019.01) |
| *G06F 11/36* | (2006.01) |
| *H04L 67/02* | (2022.01) |
| *G06F 16/901* | (2019.01) |

(52) U.S. Cl.
CPC ...... *G06F 11/3688* (2013.01); *G06F 11/3612* (2013.01); *G06F 11/3684* (2013.01); *G06F 16/901* (2019.01); *H04L 67/02* (2013.01)

(58) Field of Classification Search
CPC ............. G06F 11/3688; G06F 16/901; G06F 11/3612; G06F 11/3684; G06F 11/3664; G06F 16/955; H04L 67/02; H04L 67/42; G06N 20/00
See application file for complete search history.

(56) References Cited

U.S. PATENT DOCUMENTS

| | | | |
|---|---|---|---|
| 2003/0018932 A1* | 1/2003 | Blum | G06F 11/273 714/46 |
| 2016/0124742 A1* | 5/2016 | Rangasamy | H04L 47/70 717/103 |
| 2018/0039565 A1 | 2/2018 | Rajagopalan et al. | |
| 2018/0164791 A1* | 6/2018 | Debes | G05B 19/41855 |
| 2018/0210745 A1* | 7/2018 | Raheja | G06F 9/466 |
| 2018/0300228 A1* | 10/2018 | Beyel, III | G06F 11/3688 |

(Continued)

FOREIGN PATENT DOCUMENTS

CN  107562472 A  1/2018

OTHER PUBLICATIONS

Luis Costa, "Unit testing with VCR", Apr. 6, 2017 (Year: 2017).*

(Continued)

*Primary Examiner* — Chat C Do
*Assistant Examiner* — Noor Alkhateeb
(74) *Attorney, Agent, or Firm* — HAYNES AND BOONE, LLP

(57) ABSTRACT

Methods, systems, and computer program products are provided to identify a set of functions within a first service module that calls a second service module. Both the first service module and the second service module are associated with an application that is structure with a plurality of interworking service modules. The first service module is executed to send requests to the second service module when the set of functions is called. The responses to the requests are captured, and stored in a snapshot data structure. A modified first service module is created, in which the set of functions are modified to return a response from the snapshot data structure in place of the second service module. A unit test is performed on the modified first service module.

11 Claims, 5 Drawing Sheets

(56) References Cited

U.S. PATENT DOCUMENTS

2018/0324204 A1* 11/2018 McClory ............. H04L 41/5041
2020/0004664 A1*  1/2020 Gonzales ............ G06F 11/3684

OTHER PUBLICATIONS

Skirmantas Jurgaitis, "Generic Record&Playback (VCR) testing approach not tied to HTTP", Dec. 28, 2017 (Year: 2017).*
Jean Paul, "Dynamically extending responsibilities using Decorator Pattern", Dec. 11, 2010) (Year: 2010).*
Asif, "Mocking Financial Middleware System", Dec. 5, 2015) (Year: 2015).*
Brian, "REST Endpoint Testing With MockMvc", May 25, 2017) (Year: 2017).*
"RAML-based Mock Service Generator for Microservice Applications Testing," http://russianscdays.org/files/pdf17/296.pdf, Accessed May 1, 2018, 12 pgs.
"Trust Your Pipeline: Automatically Testing an End-to-End Java Application," https://medium.com/@eliasnogueira/trust-your-pipeline-automatically-testing-an-end-to-end-java-application-4a33232180c3, Accessed May 1, 2018, 9 pgs.
"Test Automation of a Microservice using Cucumber, Java and OpenAPI," http://connect.cd/2017/10/introduction-to-microservice-test-automation-with-cucumber-jvm-and-openapi/, Accessed May 1, 2018, 12 pgs.
"Testing asp.net Core Services and Web Apps," https://docs.microsoft.com/en-services-web-apps, Accessed May 1, 2018, 3 pgs.
"Spring Boot: Unit Testing and Mocking with Mockito and JUnit," https://dzone.com/articles/spring-boot-unit-testing-and-mocking-with-mockito, Accessed May 1, 2018, 16 pgs.

* cited by examiner

SNAPSHOT SIMULATION OF SERVICE MODULE RESPONSES

FIELD OF DISCLOSURE

The present disclosure relates generally to data processing and software development, and more specifically to computer program testing and debugging.

BACKGROUND

Software testing provides information about the quality of the software product. Test techniques include the process of executing a program or application to find software bugs, errors, and other types of defects that may cause software to respond incorrectly to inputs, generate incorrect outputs, fail to perform its function, etc.

Software may be structured in a variety of manners. For example, one type of software structure is referred to as a micro-service architecture. In a micro-service architecture, an application is structured as a plurality of individual services. Each service may make function calls to other services. While a micro-service architecture provides many benefits, it can provide some challenges for testing.

One type of testing that is used for microservices is referred to as unit testing. Unit testing tests the internal structures or workings of a particular service using test cases designed to exercise paths through the source code. For example, code coverage testing may be performed to determine if each function, subroutine, statement, branch, or condition in the source code has been called. In most cases, software with a high amount of test coverage is more desirable than software with a low amount of test coverage, as a high amount of test coverage reduces the likelihood of undetected bugs. However, because of time, budget and other practical constraints, a high amount of test coverage is not always possible.

Another type of testing, integration testing, tests combinations of the various services in the micro-service architecture and how such services work together. While unit testing is focused on detecting bugs in individual services, integration testing is focused on detecting compatibility issues or other bugs between groups of services.

SUMMARY

A system of one or more computers can perform particular operations or actions by virtue of having software, firmware, hardware, or a combination thereof installed on the system that in operation causes or cause the system to perform the actions. One or more computer programs can perform particular operations or actions by virtue of including instructions that, when executed by data processing apparatus, cause the apparatus to perform the actions. One general aspect includes a method including: identifying, within a first service module, a set of functions that calls a second service module, both the first service module and the second service module associated with an application that is structured with a plurality of interworking service modules; executing the first service module to send requests to the second service module when the set of functions is called; capturing responses to the requests; storing the responses in a snapshot data structure; creating a modified first service module in which the set of functions are modified to return a response from the snapshot data structure in place of the second service module; and performing a unit test on the modified first service module. Other examples of this aspect include corresponding computer systems, apparatus, and computer programs recorded on one or more computer storage devices, each to perform the actions of the methods.

One general aspect includes a non-transitory machine-readable medium having stored thereon machine-readable instructions executable to cause a machine to perform operations including: identifying, within a first service module, a set of functions that calls a second service module, both the first service module and the second service module associated with an application that is structured with a plurality of interworking service modules; executing the first service module to send requests to the second service module when the set of functions is called; capturing responses to the requests; storing the responses in a snapshot data structure; creating a modified first service module in which the set of functions are modified to return a response from the snapshot data structure in place of the second service module; and performing a unit test on the modified first service module. Other examples of this aspect include corresponding computer systems, apparatus, and computer programs recorded on one or more computer storage devices, each to perform the actions of the methods.

One general aspect includes a computing system including: a non-transitory memory storing a code coverage module, one or more hardware processors coupled to the non-transitory memory and that execute instructions to cause the system to perform operations including identifying, within a first service module, a set of functions that calls a second service module, both the first service module and the second service module associated with an application that is structured with a plurality of interworking service modules. The operations also include executing the first service module to send requests to the second service module when the set of functions is called. The operations also include capturing responses to the requests, and storing the responses in a snapshot data structure. The operations also include creating a modified first service module in which the set of functions are modified to call the snapshot data structure rather than the second service module. The operations also include performing a unit test on the modified first service module. Other examples of this aspect include corresponding computer systems, apparatus, and computer programs recorded on one or more computer storage devices, each to perform the actions of the methods.

BRIEF DESCRIPTION OF TH DRAWINGS

DETAILED DESCRIPTION

Figure 1:
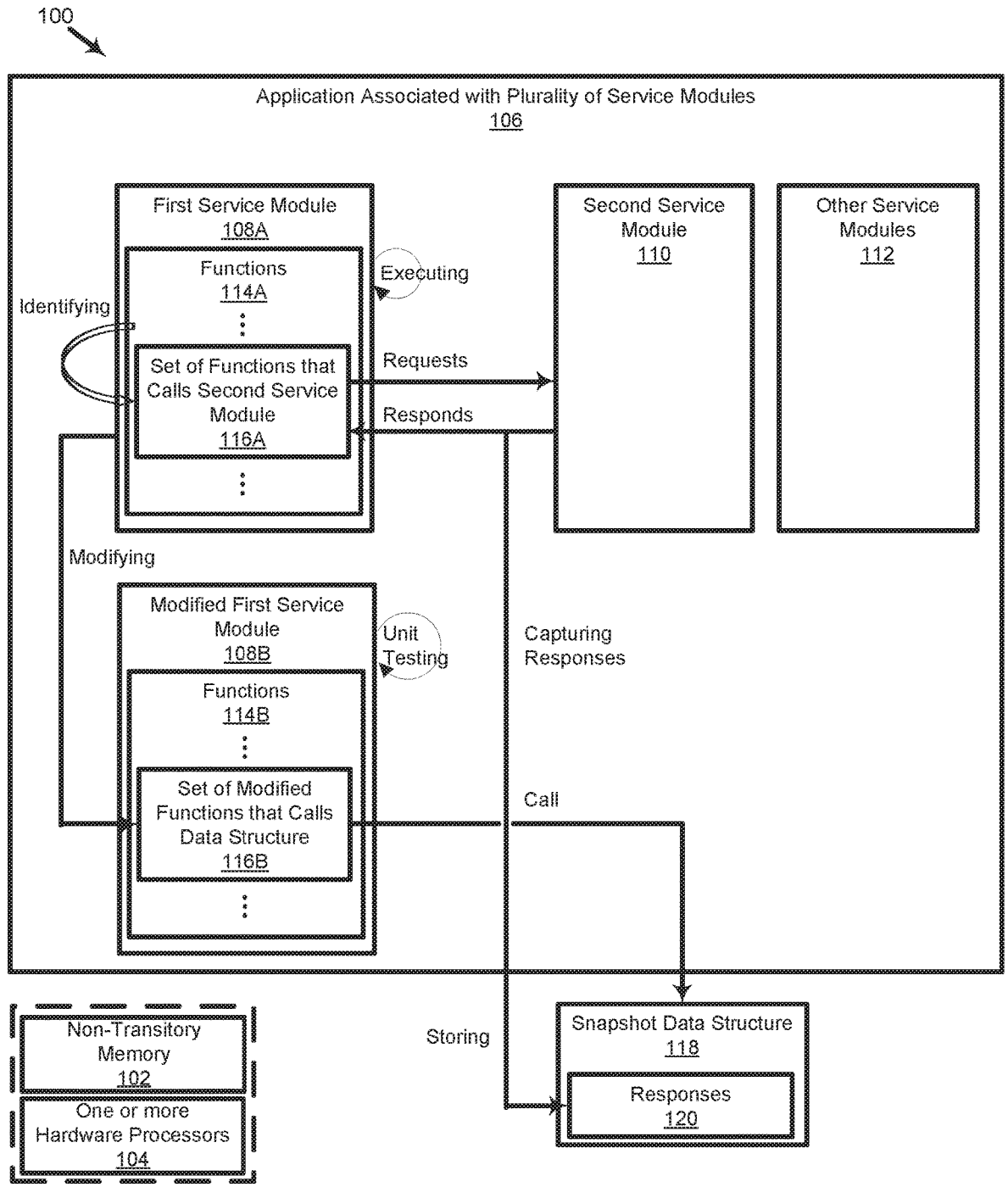
FIG. 1 is an organizational diagram illustrating a system to perform a unit test on a service module using a snapshot data structure, in accordance with various examples of the present disclosure.

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Software testing suites can automate execution of tests to eliminate some repetitive tasks. For example, a test automation interface can provide a workspace that includes a command line interface or a graphical user interface and scripts with which a user can interact to perform software testing. Users can manipulate the command line or graphical features of the workspace to configure and run software tests.

Software testing generally involves executing different software or system components in order to evaluate different properties of interest, such as efficiency, the correct response to input, or whether the system can run in the user's preferred environment. A typical error that testing may expose is a coding error, but there may be other issues, such as environmental issues as well. There are different styles of software testing, such as unit testing, integration testing, and system testing. Unit testing is performed on particular sections of software code. Integration testing focuses on making sure the interfaces of different components is verified, finally, system testing is performed to make sure that the system meets its requirements.

It is advantageous for a test execution environment to collect all relevant information corresponding to the execution of a binary so that software developers can identify and correct failures. However, setting up such a comprehensive test execution environment so that all possible relevant information is collected is a cumbersome and time consuming process, and requires deep knowledge on the part of software developers to design intelligent tests for each of the software's features that they would like to have tested.

For example, when an application is serviced by a large network of interworking service modules, such as in a micro-services architecture, there may simply be too many individual service modules to test. Yet, it is important to test the individual service modules because any one component change can break the application programming interface (API) or cause it to perform differently than expected. Because many of such service modules are often interconnected and call upon one another in the micro-services environment, testing individual service module often requires a large number of inter-service requests and responses. In other words, integration or interoperability testing requires heavy testing of the environment itself, and many times the tests fail due to a problem which is not related to the code. Another issue with integration testing is the sheer exponential volume of requests and responses generated when testing groups of service modules call on other service modules. These consume a significant amount of time and computer resources, and add unnecessary complexity to testing. Thus, it is desirable to develop improved testing techniques that can perform unit and integration testing in a more efficient and user-friendly way.

The techniques described herein provide solutions to the problems described above with respect to traditional integration testing. Generally, the techniques mock or stub integrated services in the unit tests rather than running them live. The mock or stub approach is performed by injecting hard-coded return values that are expected to return from the integrated environment or micro-services architecture, and therefore provides a way for testers to simulate responses from a connected service module. Simulating the integration environment reduces the risk that the changes made in a given service will break the service. The responses may be stored in a test directory and used as a "golden environment" when running the tests. Specifically, the techniques simulate the integration environment by executing a set of functions that calls the connected service module and capturing the responses of the connected service module. The responses are stored in a snapshot data structure, and the calling function is modified such that it calls the snapshot data structure instead of the connected service module. One advantage is that since the responses may be stored offline, testers may perform their tests with minimal risk of affecting the live service. Another advantage is that network latency associated with calling and waiting for a response from the connected service module is minimized or eliminated, since the snapshot data structure may be stored locally on the tester's system. As a result of the techniques described herein, interconnected service modules may be safely and efficiently tested.

Further, the testing information may be used to reduce the amount of testing that needs to be done when code is modified, and also to reduce the amount of work required of a developer to configure the testing suite to perform particular tests, because the testing suite may dynamically determine additional tests to perform. For example, if a new type of request or response is added to the code or detected in execution since the last testing, the service module and its associated service modules may be tested on the additional requests and responses. Moreover, by dynamically determining and collecting relevant testing information, system resources can be preserved by avoiding the collection and storing of irrelevant information. Further, the efficiency of the computing systems used to perform the testing is also improved, as testing may be selectively performed on just the additional and/or new functions in the modified code without testing all of the functions again, resulting in less processing, network, and/or storage requirements. A user may also be alerted to any changes to the testing protocol using visual and/or auditory cues, such as the need to run tests on additional and/or new functions using their corresponding testing functions, improving user engagement with the testing suite.

FIG. 1 is an organizational diagram illustrating a system 100 system to perform a unit test on a service module using a snapshot data structure, in accordance with various examples of the present disclosure.

The system 100 includes non-transitory memory 102 and one or more hardware processors 104. In more detail regarding the non-transitory memory 102, the non-transitory memory 102 is structured to include at least one machine-readable storage medium on which is stored one or more set of instructions (e.g., software) including any one or more of the methodologies or functions described herein. The non-transitory memory 102 may be structured to include one or more of a read-only memory (ROM), flash memory, dynamic random access memory (DRAM) such as synchronous DRAM (DFRAM), double data rate (DDR SDRAM), or DRAM (RDRAM), and so forth, static memory (e.g., flash memory, static random access memory (SRAM), and so forth), and a data storage device (e.g., a hard disk drive (HDD), solid state drive (SSD), and so forth). Accordingly, any of the operations, steps, and actions of the methods described herein may be implemented using corresponding machine-readable instructions stored on or in the non-transitory memory 102 that are executable by the hardware processor 104.

In more detail regarding the hardware processor 104, the hardware processor 104 is structured to include one or more general-purpose processing devices such as a microprocessor, central processing unit (CPU), and the like. More particularly, the hardware processor 104 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the hardware processor 104 is structured to include one or more special-purpose processing devices such as an application specific integrated circuit (ASIC), a field programmable gate array (FPGA), a digital signal processor (DSP), network processor, and so forth. The hardware processor executes instructions for performing the operations, steps, and actions discussed herein.

The non-transitory memory 102 is structured to store at least a first service module 108A and a second service module 110. Other service modules 112 may also be stored. These service modules may be associated with an application 106 associated with a plurality of interworking service modules, such as an application associated with a plurality of micro-services in a micro-services architecture. The first service module 108A includes functions 114A, which in turn includes a set of functions 116A which call the second service module 110. In some examples, the set of functions 116A may include functions with an address associated with the second service module 110. For example, a function that may be included in the set of functions 116A may be a "get" function to retrieve data from an address such as a website associated with the second service module.

In some examples, after the set of functions 116A is identified, the first service module 108A may be executed. More particularly, the set of functions 116A may be executed. As a result of the execution, requests may be sent from the first service module 108A to the second service module 110. Second service module 110 may respond to the requests, and the responses 120 from the second service module 110 may be captured and stored in a snapshot data structure 118.

In some examples, the first service module 108A is executed so as to identify the set of functions 116A. A multitude of responses from the second service module 110 and other service modules 112 may be received as a result. In some examples, assuming the second service module 110 is the service module of interest for testing purposes, only the responses 120 of the second service module 110 may be captured and stored in the snapshot data structure 118.

At the same time or after the responses are captured, the first service module 108A may be modified. Modified first service module 108B may include functions 114B, which in turn includes a set of modified functions 116B. The set of modified functions 116B may include functions 114A modified to call or return a response from the snapshot data structure 118 instead of the second service module 110.

Unit testing may then be performed on the modified first service module 108B. During the testing, instead of calling and waiting for live responses from the second service module 110, responses 120 stored in the snapshot data structure are provided to the first service module 108A.

Figure 2:
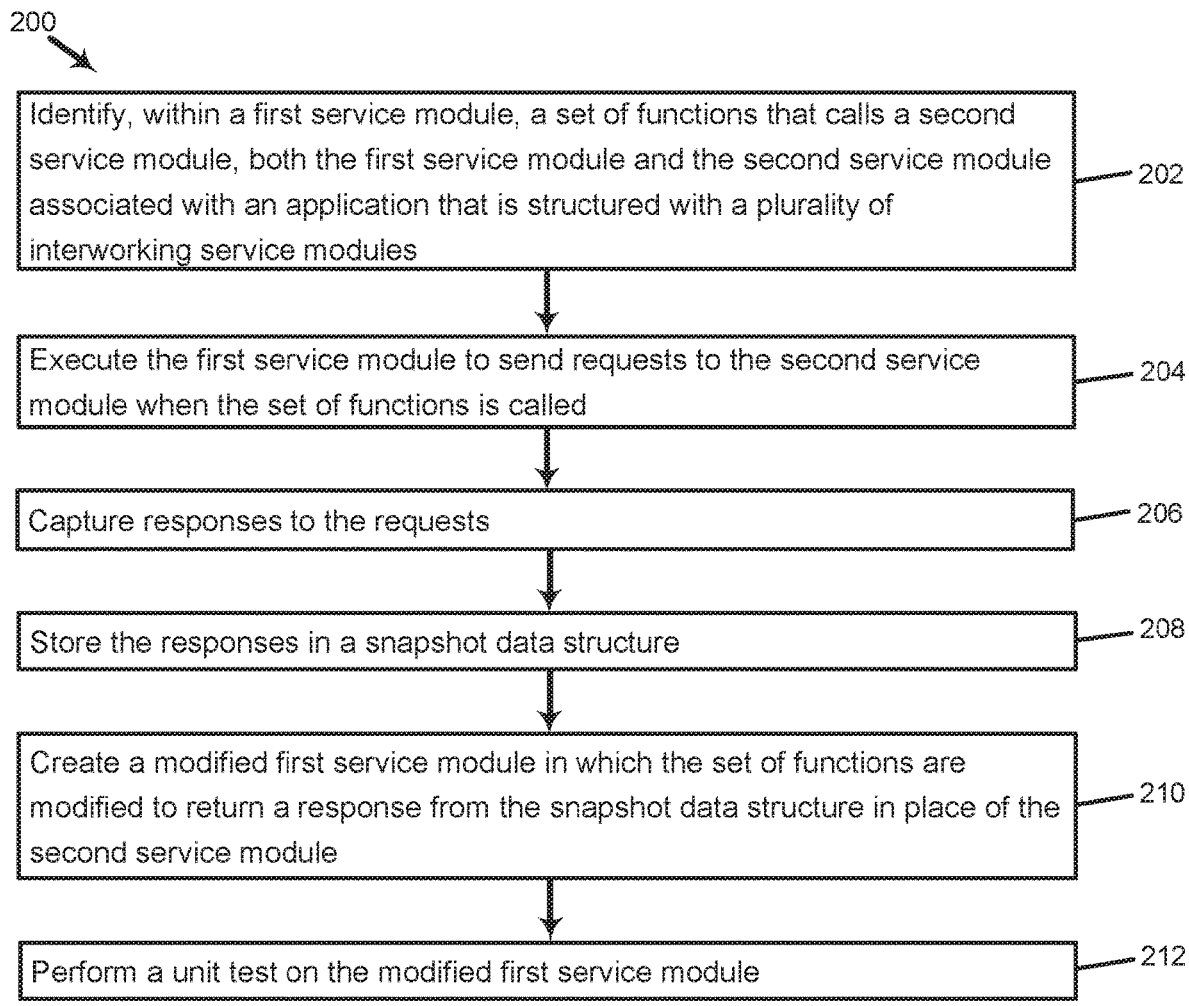
FIG. 2 is a flow diagram illustrating a method to perform a unit test on a service module using a snapshot data structure, in accordance with various examples of the present disclosure.

FIG. 2 is a flow diagram illustrating a method 200 to perform a unit test on a service module using a snapshot data structure, in accordance with various examples of the present disclosure. In some examples, the method is performed by executing computer-readable instructions that are stored in non-transitory memory 102 using one or more hardware processors 104 described with respect to FIG. 1. Additional actions may be provided before, during, and after the steps of method 200, and some of the actions described may be replaced, eliminated and/or re-ordered for other examples of the method 200. For example, method 200 may be performed in conjunction with systems 100, 300, and 400 described with respect to FIGS. 1, 3, and 4, and with method 500 described with respect to FIG. 5.

At action 202, a set of functions that calls a second service module is identified. The set of functions may be stored within or associated with a first service module. Both the first service module and the second service module may be associated with an application that is structured with a plurality of interworking service modules. In some examples, such as in a micro-services architecture, the first service module may be a first micro-service, while the second service module may be a second micro-service. The micro-services architecture may also include many other micro-services, and the micro-services may work with one another to deliver an overall service provided by an application. For example, a service may communicate with another service using an application programming interface (API). In some examples, services may communicate indirectly with one another using an API gateway. The API gateway may be used to direct requests from a client to the appropriate services on the backend, collect the responses, and return them to the client.

At action 204, the first service module is executed. In some examples, the execution of the first service module causes requests to be sent to the second service module when the aforementioned set of functions is called. In some examples, as earlier described, only the identified set of functions is specifically called. In some examples, the requests are not sent directly to the second service module by the first service module, but are instead sent through the API gateway, client, or application, or any combination thereof.

At action 206, the responses to the requests or calls are captured. In some examples, the responses are returned directly to the first service module and captured by the system, such as system 100. In some examples, the responses are not returned directly to the first service module, and are instead returned to a client or application. The system may capture the response to the client or the application, since the client or the application runs on the system.

At action 208, the responses are stored in a snapshot data structure. The snapshot data structure may be a table, an array, a linked list, a record, a union, a tagged union, a class, graph, binary tree, or any other type of data structure. The snapshot data structure may be included as part of the application, or may be a separate program from the application but associated with it. In some examples, the requests and their associated responses are stored in the snapshot data structure. In some examples, only the responses are stored in the snapshot data structure.

At action 210, a modified first service module is created. In some examples, the set of functions is modified to call or return a response from the snapshot data structure instead of the second service module. In some examples, the set of functions may be "monkey patched" and/or modified using a decorator. Monkey patching and/or decorating may refer generally to dynamic runtime modifications, and may be used to replace a function at runtime, to stub out a function during testing, to modify or extend the behavior of a function without modifying the source code saved on disk, etc. Monkey patching and/or decorating may also be applied to methods and attributes.

For instance, monkey patching may be used to replace the "get," "post," and "delete" hypertext transfer protocol (HTTP) methods, each of which may call on the second service module. In some examples, the old methods' functionalities may be saved in a new function named "old_get." The old methods may be decorated with a function that takes the snapshot or uses the snapshot, and then assigns "requests.get" to the new function. For example, in the Python programming language, this may be implemented as follows:

old_function=requests.get
requests.get=snapshot(mode=env.MODE, servicesAddresses=[ . . . . ])(old_function)

In the first line Python "creates" a new function called "old_function" and it points to the same memory address where "requests.get" points. The function's execution data is stored in that memory address.

In the second line, a method called "snapshot" is used. As shown, "snapshot" is a function that returns a decorator. The "snapshot" takes an argument which is the snapshot mode (e.g., capture responses, use snapshot, or ignore snapshot) and returns a decorator according to the mode. Also "snapshot" takes a list of addresses to know what services are relevant to the snapshot mode.

The decorator that is returned takes an argument which is a "requests" method (i.e., get, post, delete) and wraps the snapshot mode functionality on top of that function. For example, the "old_function," such as "old_get" is passed into the new "requests.get" function. Notice that the "requests.get" function includes an address field including the address from which the responses will be provided to the first service module. The address may vary depending on the snapshot mode. For example, in "capture responses" or "ignore snapshot" mode, the address may be a web address of the second service module. In "use snapshot mode," the address may be the address or local file path of the snapshot data structure.

At action 212, the modified first service module is tested. In some examples, the testing includes unit testing or integration testing or both. In some examples, other testing is performed, including system testing and/or acceptance testing. During the unit testing, the responses from the snapshot data structure may be provided to the first service module in "use snapshot" mode. The responses may be provided directly from the data structure to the first service module, or indirectly through the client or application.

Figure 3:
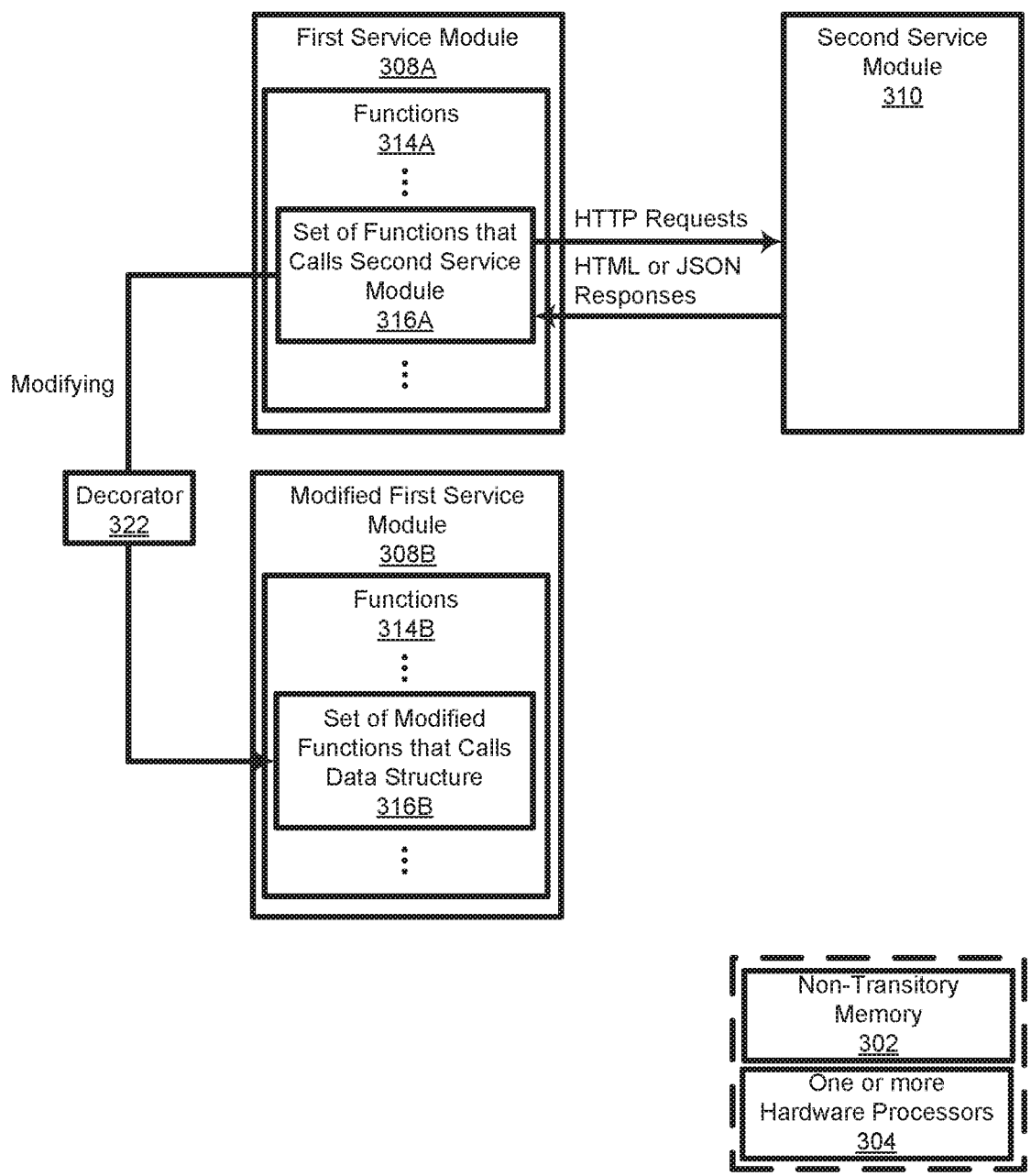
FIG. 3 is an organizational diagram illustrating a system for capturing HTTP requests and responses in which a decorator is used to modify a set of functions such that the set calls a data structure instead of a service module, in accordance with various examples of the present disclosure.

FIG. 3 is an organizational diagram illustrating a system for capturing HTTP requests and responses in which a decorator is used to modify a set of functions such that the set calls a data structure instead of a service module, in accordance with various examples of the present disclosure. System 300 includes non-transitory memory 302 and one or more hardware processors 304 similar to those described with respect to FIG. 1. The one or more hardware processors 304 execute instructions for performing the operations, steps, and actions discussed herein. The non-transitory memory 302 is structured to store at least a first service module 308A, a second service module 310, and a decorator 322. The first service module 308A may be modified, after which it may be known and stored as modified first service module 308B. The modified first service module 308B may overwrite first service module 308A or may be stored as a separate file as first service module 308A.

First service module 308A may be structured to include functions 314A. A set of functions 316A from among functions 314A may call the second service module 310. For example, a function call may result in a hypertext transfer protocol (HTTP) request being made by first service module 308A to the second service module 310. The HTTP request may result in a plain text response, hypertext transfer markup language (HTML) response, JavaScript Object Notification (JSON) response, or any other HTTP response by the second service module 310. In some examples, the HTTP request passes indirectly from the first service module 308A to the second service module 310 via a client, application, and/or API gateway. Likewise, the HTTP response may also pass indirectly from the second service module 310 to the first service module 308A via the same.

The set of functions 316A may be modified by a decorator 322 in the manner described with respect to FIG. 2. After modification, the first service module 308A may be known as modified first service module 308B, the functions 314A may be known as functions 314B, and the set of functions 316A may be known as the set of modified functions 316B. The set of modified functions 316B may call or return a response from a snapshot data structure instead of the second service module 310. In some examples, as described with respect to FIG. 2, whether the snapshot data structure or the second service module 310 is called may depend on the snapshot mode.

Figure 4:
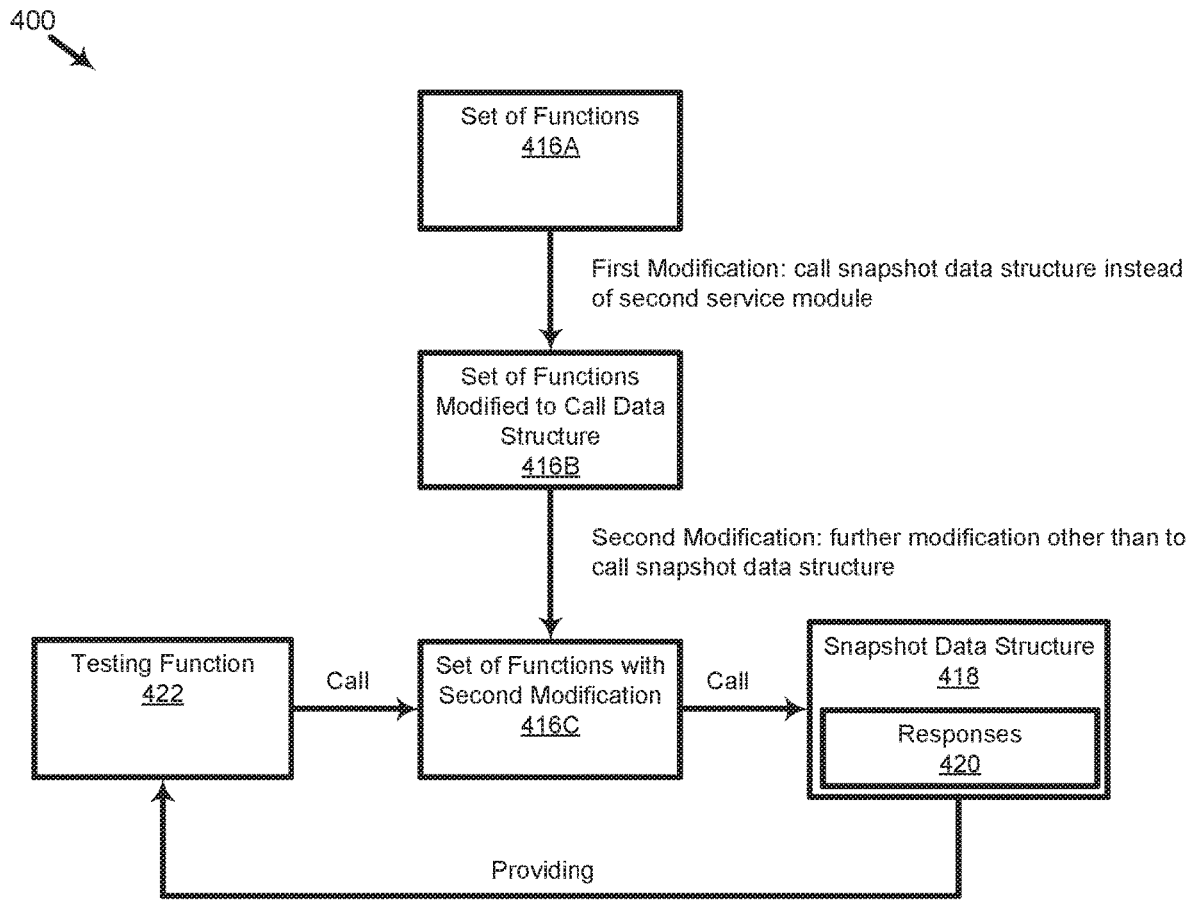
FIG. 4 is an organizational diagram illustrating a system for testing a function that has had two modifications: a first modification to call a snapshot data structure instead of a service module, and a second modification which modifies the function in some other way, in accordance with various examples of the present disclosure.
Figure 4:
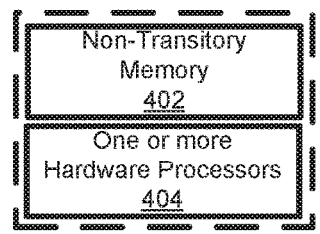

FIG. 4 is an organizational diagram illustrating a system for testing a function that has had two modifications: a first modification to call or return a response from a snapshot data structure instead of a service module, and a second modification which modifies the function in some other way, in accordance with various examples of the present disclosure. System 400 includes non-transitory memory 402 and one or more hardware processors 404 similar to those described with respect to FIG. 1. The one or more hardware processors 404 execute instructions for performing the operations, steps, and actions discussed herein. The non-transitory memory 402 is structured to store at least a set of functions 416A, a snapshot data structure 418, and a testing function 422. The set of functions 416A may be similar to the set of functions 316A earlier described with respect to FIG. 3. Like the set of functions 316A, the set of functions 416A may undergo a first modification to call or return a response from the snapshot data structure 418 instead of a service module. In some examples, the modification is performed by monkey patching and/or decorating the set of functions 416A. The set of modified functions 416B may undergo a second modification to change the set of modified functions 416B in some other way than pointing the function to the snapshot data structure 418. This set of second-modified functions may be known as the set of modified functions 416C.

For example, in a mobile banking application, there may be a "get_account_number" function which uses an HTML get method to retrieve a user's account number from a secure banking website. The "get_account_number" function may be first modified to retrieve the user's account number stored in a snapshot data structure 418. For example, in the interest of improving a user's banking security, a developer may make a second modification to the "get_account_number" function to retrieve only the last four digits of the user's account number. The developer may be interested to know whether the second modification would cause any unforeseen problems with the second-modified "get_account_number" function or with any of the associated service modules that use or are called on by the "get_account_number" function, and therefore uses a testing function to call the second-modified "get_account_number" function and/or its associated functions.

The "get_account_number" function may be used by an online check deposit micro-service, a money transferring micro-service, or a credit card payment micro-service. The responses from each of these services (and in general, any service or function that uses the "get_account_number" function) may be captured and stored in the snapshot data structure 418. The relevant part of stored responses 420, i.e., the last four digits of the user's bank account number in this example, may be returned from the snapshot data structure 418 to the second-modified "get_account_number" function. The testing may reveal that the "get_account_number" function may work correctly with some services but not others. For example, the online check deposit and credit card payment service modules may not require a user's full account number to perform their various depositing and payment functions, and therefore work well even if the "get_account_number" function has been modified to retrieve just the last four digits. However, the money transfer service may use the output of "get_account_number" to post or fill in a field in a transfer form, and the field may require a user's full bank account number for the transfer to be made. Since the modified "get_account_number" function only returns the last four digits, testing would reveal that the second modification has broken or caused an error in the money transferring micro-service.

Figure 5:
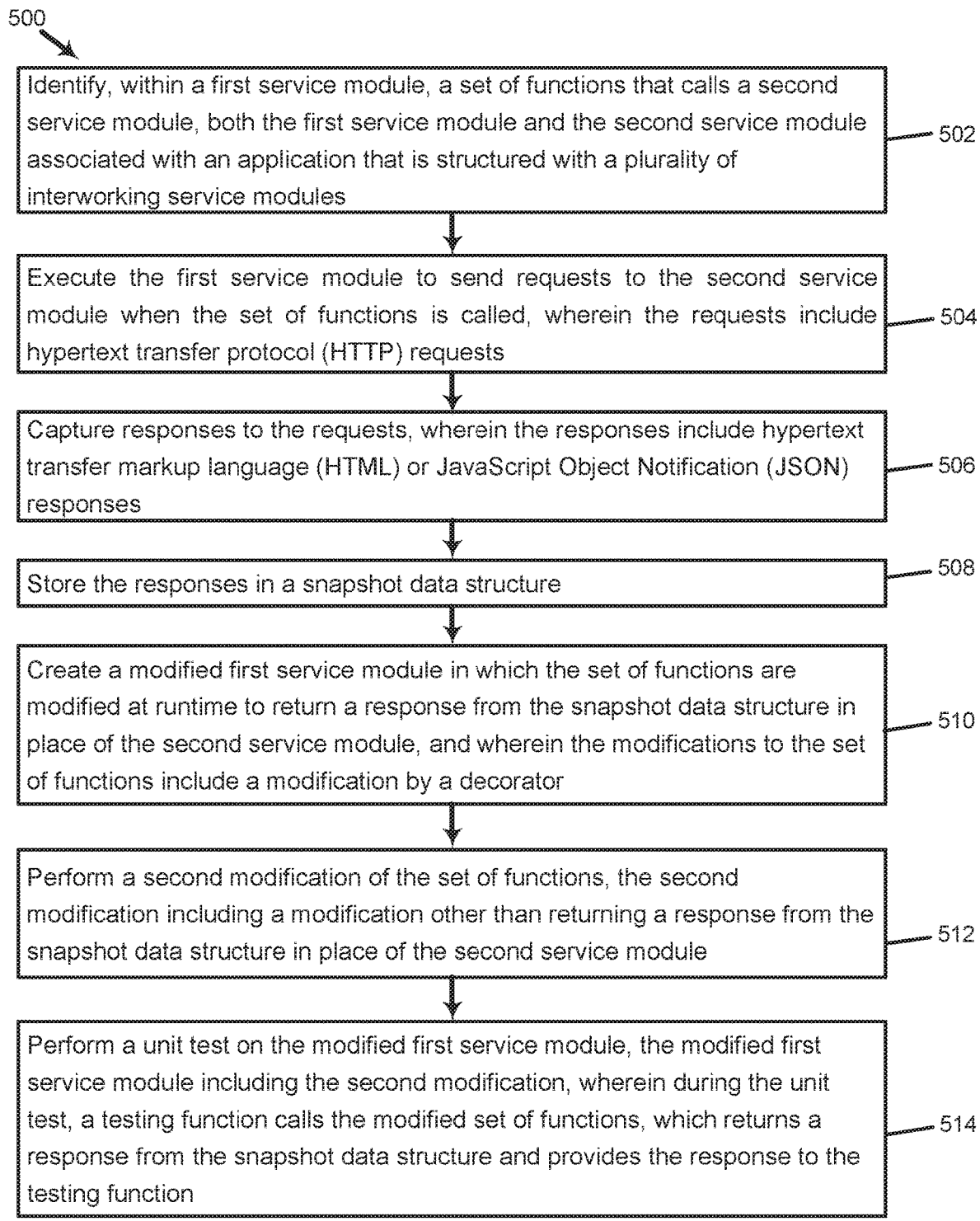
FIG. 5 is a flow diagram illustrating a method to perform a unit test on a service module using a snapshot data structure, in accordance with various examples of the present disclosure.

FIG. 5 is a flow diagram illustrating a method to perform a unit test on a service module using a snapshot data structure, in accordance with various examples of the present disclosure. In some examples, the method is performed by executing computer-readable instructions that are stored in non-transitory memory 302 using one or more hardware processors 304 described with respect to FIG. 3. Additional actions may be provided before, during, and after the steps of method 500, and some of the actions described may be replaced, eliminated and/or re-ordered for other examples of the method 500. For example, method 500 may be performed in conjunction with systems 100, 300 and 400 described with respect to FIGS. 1, 3, and 4, and with method 200 described with respect to FIG. 2.

At action 502, a set of functions that calls a second service module is identified. Both the first service module and the second service module may be associated with an application that is structured with a plurality of interworking service modules. For example, the interworking service modules may be the micro-service modules of a micro-services architecture.

At action 504, the first service module is executed, thereby sending requests to the second service module when the set of functions described in action 502 is called. In some examples, the identified set of functions may be monkey patched and/or decorated prior to the execution as described with respect to FIG. 2, and the set of modified functions may be executed in a "capture responses" mode where the responses are captured from the second service module and stored in the snapshot data structure. In some examples, the requests sent may be HTTP requests or variants of HTTP requests such as Ajax or XML HTTP requests. Various scripting languages may be used to make the HTTP requests, such as Hypertext Preprocessor (PHP), Python, JavaScript, Node, etc.

At action 506, the responses to the requests are captured. The responses may include plain text responses, HTML responses, JSON responses, Extensible Markup Language (XML) responses, PUP responses, Node responses, etc. More generally, the responses may include numbers, strings, Booleans, arrays, objects, etc., and may also be a null response. The response may be in a language-independent data format, and may consist of attribute-value pairs or serializable values.

At action 508, the responses are stored in a snapshot data structure. The snapshot data structure may include an identifier of each modified function in the set of modified functions, an identifier of the first service module, an identifier of the second service module, and an identifier of any other service module which has provided a response. The data structure may also include the corresponding responses by each of the service modules, and may state the snapshot mode of each modified function in the set of modified functions. If the set of functions has not been modified, then the snapshot mode may be null or not applicable.

At action 510, a modified first service module is created. If the set of functions have already been modified (e.g., by monkey patching and/or decorating) and includes a snapshot mode (thereby creating a modified first module), the snapshot mode may be changed from "capture responses" to "use snapshot" at action 510. If the set of functions have not been modified, then they may be modified to include a snapshot mode set to "use snapshot" at this stage, so that future service requests from the set of functions will be directed to the snapshot data structure rather than to a service module. Accordingly, the responses will be provided by the snapshot data structure rather than the service module.

At action 512, a second modification is performed on the set of functions. The second modification may be a modification other than calling the snapshot data structure in place of the second service module, i.e., the modification may something other than changing the snapshot mode from "capture responses" or "ignore snapshot" to "use snapshot." For example, as described earlier, the modification may include changing the "get_account_number" function from returning all the digits of a user's bank account number to returning only the last four digits of the user's bank account number.

At action 514, a unit test is performed on the modified first service module after it has been modified with the second modification. A testing function may be used to perform the unit test. During the unit testing, the testing function may call the set of modified functions. The set of modified functions may, based on the snapshot mode (e.g., "use snapshot"), return a response from a local snapshot data structure and provide the response to the testing function. However, if the mode were "ignore snapshot" or "capture responses," the response may instead be provided by a live service module.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method comprising:
identifying, within a first service module, a set of functions that calls a second service module, both the first service module and the second service module associated with an application that is structured with a plurality of interworking service modules;
executing the first service module to send requests to the second service module when the set of functions is called;
capturing responses to the requests;
storing the responses in a snapshot data structure, wherein the snapshot data structure includes a first unique identifier of the first service module, a second unique identifier of the second service module, and a snapshot mode;
with a decorator that makes dynamic runtime modifications, creating a modified first service module in which the set of functions are modified by a first modification to return a response from the snapshot data structure in place of the second service module;
after performing the first modification, performing a second modification to modify the set of functions such that the modified first service module retrieves fewer digits of an account number from the snapshot data structure in place of the second service module, such that the modified first service module includes functions that are modified by both the first and the second modifications; and
after performing the first and the second modifications, performing a unit test on the modified first service module in accordance with the snapshot mode, wherein the unit test is performed on the functions of the set of functions that are modified by both the first and second modifications.

2. The method of claim 1, wherein the requests include hypertext transfer protocol (HTTP) requests.

3. The method of claim 1, wherein the responses include hypertext transfer markup language (HTML) or JavaScript Object Notification (JSON) responses.

4. The method of claim 1, wherein during the unit test:
a testing function calls the set of functions after the first modification and the second modification; and
the responses are provided to the testing function via the set of modified functions.

5. A non-transitory machine-readable medium having stored thereon machine-readable instructions executable to cause a machine to perform operations comprising:
identifying, within a first service module, a set of functions that calls a second service module, both the first service module and the second service module associated with an application that is structured with a plurality of interworking service modules;
executing the first service module to send requests to the second service module, the executing including calling the set of functions;
capturing responses to the requests;
storing the responses in a snapshot data structure, wherein the snapshot data structure includes a first unique identifier of the first service module, a second unique identifier of the second service module and a snapshot mode;
with a decorator that makes dynamic runtime modifications, creating a modified first service module in which the set of functions are modified by a first modification to call the snapshot data structure rather than the second service module;
after performing the first modification, performing a second modification to modify the set of functions in a manner other than returning a response such that the modified first service module retrieves fewer digits of an account number from the snapshot data structure in place of the second service module, such that the modified first service module includes functions that are modified by both the first and the second modifications; and
after performing the first and the second modifications, performing a unit test on the modified first service module in accordance with the snapshot mode, wherein the unit test is performed on the functions of the set of functions that are modified by both the first and second modifications.

6. The non-transitory machine-readable medium of claim 5, wherein the requests include hypertext transfer protocol (HTTP) requests.

7. The non-transitory machine-readable medium of claim 5, wherein the responses include hypertext transfer markup language (HTML) or JavaScript Object Notification (JSON) responses.

8. The non-transitory machine-readable medium of claim 5, wherein during the unit test:
a testing function calls the set of modified functions after the first modification and the second modification; and
the responses are provided to the testing function via the set of modified functions.

9. A computing system comprising:
a non-transitory memory storing a code coverage module;
one or more hardware processors coupled to the non-transitory memory and that execute instructions to cause the system to perform operations comprising:
identifying, within a first service module, a set of functions that calls a second service module, both the first service module and the second service module associated with an application that is structured with a plurality of interworking service modules;
executing the first service module to send requests to the second service module when the set of functions is called;
capturing responses to the requests;
storing the responses in a snapshot data structure, wherein the snapshot data structure includes a first unique identifier of the first service module, a second unique identifier of the second service module, and a snapshot mode;
with a decorator that makes dynamic runtime modifications, creating a modified first service module in which the set of functions are modified by a first modification to return a response from the snapshot data structure in place of the second service module;

after performing the first modification, performing a second modification to modify the set of functions such that the modified first service module retrieves fewer digits of an account number from the snapshot data structure in place of the second service module, such that the modified first service module includes functions that are modified by both the first and the second modifications; and after performing the first and the second modifications, performing a unit test on the modified first service module in accordance with the snapshot mode, wherein the unit test is performed on the functions of the set of functions that are modified by both the first and second modifications.

10. The system of claim 9, wherein the requests include hypertext transfer protocol (HTTP) requests and hypertext transfer markup language (HTML) responses or JavaScript Object Notification (JSON).

11. The system of claim 9, wherein during the unit test:
a testing function calls the set of modified functions after the first modification and the second modification; and
the responses are provided to the testing function via the set of modified functions.

\* \* \* \* \*